July 14, 1931.     E. EDWIN     1,814,908
PACKING
Filed Sept. 9, 1927     2 Sheets-Sheet 1

Inventor
Emil Edwin
By Knight Bros
Attys

July 14, 1931.  E. EDWIN  1,814,908
PACKING
Filed Sept. 9, 1927   2 Sheets-Sheet 2

Inventor
Emil Edwin
By Knight Bros.
Attorneys

Patented July 14, 1931

1,814,908

UNITED STATES PATENT OFFICE

EMIL EDWIN, OF TRONDHJEM, NORWAY, ASSIGNOR TO FRIED. KRUPP GRUSONWERK AKTIENGESELLSCHAFT, OF MAGDEBURG-BUCKAU, GERMANY

PACKING

Application filed September 9, 1927, Serial No. 218,543, and in Germany May 20, 1927.

This invention relates to a packing for parts which are subject to heat and of which one part is moved relatively to the other. The invention is more particularly intended for the packing of rotating containers, furnaces, and the like used for metallurgical purposes, the inner space of which must be shut off from the outside in a gas tight manner. Hitherto it has been very difficult to ensure a gas tight joint of such containers, furnaces etc. at the places where the joint had to be made with the temporarily or continuously moving part or parts. In many cases it is however of the utmost importance and absolutely essential to have a perfectly tight joint between the packing faces when it is desired to prevent the escape of poisonous gases, more particularly if such gases are under pressure.

The present invention provides a practically perfect solution of the problem which arises as regards packings of the rubbing-collar type in the cases with which the present invention is alone concerned, namely a packing for a heat emitting drum or the like, such as a rotary furnace, rotatable in a stationary housing and having packing surfaces coaxial with the drum provided respectively upon the rotatable drum and the stationary housing, and is based on the fact that there are especially suitable as the packing substance consistent materials such as fat of the kind which undergo a change in condition when heated to relatively moderate temperatures, that is to say the density of which decreases on a relatively moderate heating owing to the occurrence of liquefaction. Hereafter throughout the present specification and claims the term "consistent materials" is used solely in the sense previously mentioned to designate materials such as fat which melt comparatively easily on heating. Heretofore however consistent materials such as fat could not be used where the packing materials were exposed to great heat as they are decomposed by the heat and lose their packing action. The present invention renders possible the use of consistent substances as packing material, even in the case of considerable heating of the joint faces, by cooling at least one of the joint faces so as to avoid any decomposition of the packing material. Preferably the two packing or joint faces are at the same time elastically pressed against each other in the known manner. The invention ensures that even in the case of the strongest possible heating, a tight joint will be perfectly effected relatively to a moving part, and the escape of gases through the joint will be prevented in a reliable manner.

In order that the said invention may be clearly understood and readily carried into effect, the same will be more fully described with reference to the accompanying drawings, in which Fig. 1 is a longitudinal section of one form of the invention as applied to a rotary container or furnace.

Figure 1:
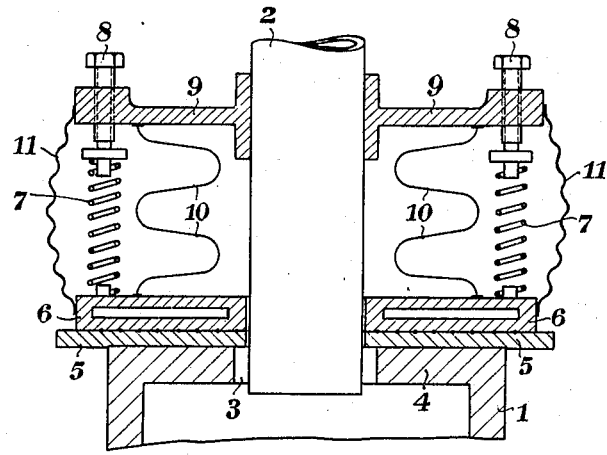

1 is a rotary container, arranged for instance vertically, into which there opens the axially arranged stationary tube 2 intended for the supply of hot gases. The opening 3 in the upper end wall 4 is greater than the diameter of the tube 2. To the end wall 4 of the rotating container 1 there is secured a packing wall (disc) 5. On the tube 2 there is mounted in a longitudinally adjustable manner a packing wall (disc) 6 which is subjected to the action of pressure springs 7. The pressure of each of these springs 7 can be regulated by means of a set screw 8 which is mounted in a holder 9 secured to the tube 2. The packing faces of the two walls 5 and 6 are therefore constantly pressed against each other. The wall 6 mounted on the stationary part is made hollow and connected to a pipe for the supply and discharge of a cooling medium. Owing to the cooling of the hollow wall 6, a consistent substance, such as for instance a fat, can be introduced as packing material between the packing faces, and owing to the cooling of the wall, it will retain its packing action.

Between the packing wall 6 and the holder 9 there is arranged an elastic packing sleeve 10 which prevents any gases that may have passed between the wall 6 and the tube 2 from escaping outwards. The packing can adjust itself to any changes of shape caused by temperature fluctuations. The packing arrangement according to the present invention permits of an unimpeded movement through expansion of the container or of the tube, or of both. The packing wall 6 can yield to a change of length of the container 1, and the packing walls can move relatively to each other, without the tight joint being destroyed. When working with a high pressure in the container 1, the pressure of any gases that may escape between the wall 6 and the tube 2 is liable to compress the elastic sleeve 10 in such a manner that it will prevent the wall 6 from moving. In order to prevent this, it may be advisable in such cases to provide outside the sleeve 10 a similar sleeve 11 between the wall 6 and the holder ring 9, and introduce into the space formed between the two sleeves a gas under pressure which will then counteract any detrimental effect which might otherwise result from gas present in the space between the tube 2 and the sleeve 10.

Figure 2:
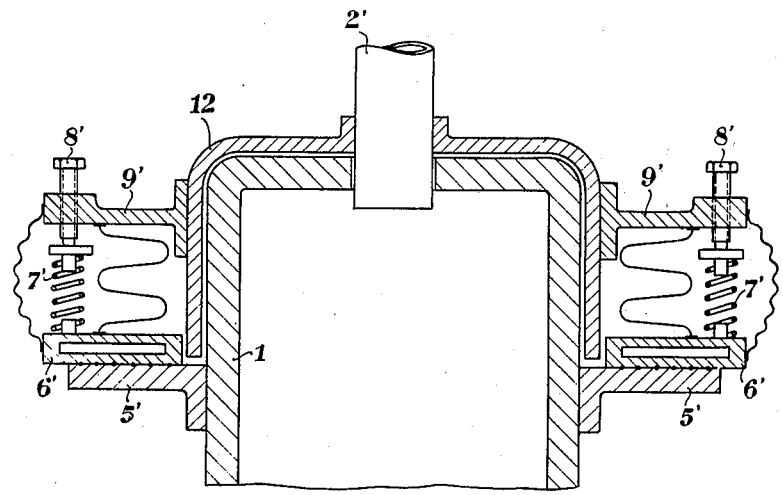
Fig. 2 is a similar view of a modified form of the invention.

The packing arrangement according to the present invention can also be provided at the circumference of the container as shown in Figure 2. In this construction the packing wall 5' of the two co-operating packing walls 5', 6' is mounted in a non-rotatable manner on the container 1, and the packing wall 6' is adjustably mounted on the sleeve 12 surrounding the end portion of the container 1 at the circumference as well as at the end face, the said sleeve 12 being also provided with the holders 9' with the set screws 8' for the pressure springs 7' to the action of which the packing walls 6' are subjected. The sleeve 12 is secured to the tube 2' through which the hot gas or material is introduced into the container 1.

In this construction of the packing a perfectly air tight closing of the parts moving relatively to each other is also ensured. The construction according to the arrangement shown in Figure 2 has the advantage over that of Figure 1 that the packing joint is more efficiently protected against penetration of dust from the container 1.

It will of course be understood that the actual practical construction of the packing can, subject to the retention of the essential features of the present invention, be different from those illustrated, as the invention is not limited to the two applications indicated. The packing can be applied wherever a gas tight joint is to be ensured between parts moving relatively to each other and which are subject to heat.

Figure 3:
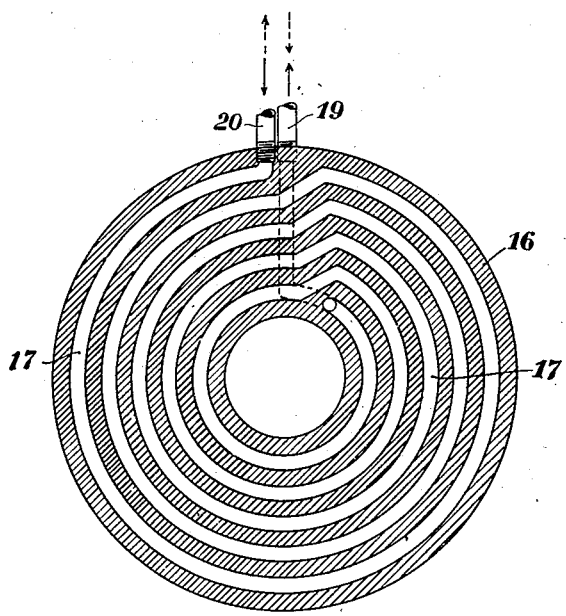
Fig. 3 is a transverse section of a packing plate constructed in accordance with another form of the invention.
Figure 5:
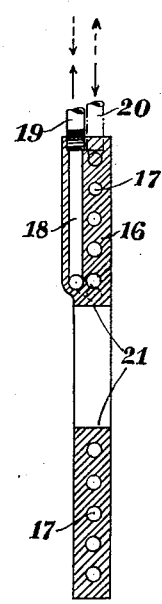
Fig. 5 is an axial section of the packing plate shown in Fig. 3.
Figure 4:
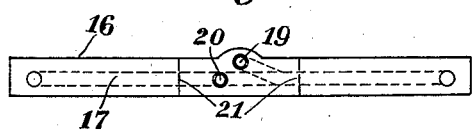
Fig. 4 is an elevation of the packing plate shown in Fig. 3.

In the cases where there is risk of dust getting between the packing faces, whether from the interior of the packed container or the like or from the space surrounding the container, the cooling medium is circulated in such a manner that it arrives last at that packing edge where there is risk of penetration of dust. The packing face is therefore cooled ununiformly, that is to say the cooling diminishes towards the dust space, and consequently the consistency of the packing material also decreases in the same direction. It is well known that consistent substances have the tendency to move in the direction of the decreasing consistency. The packing material introduced at the other side will therefore move in the direction opposite to that in which penetration of dust could take place, so that any dust that gets in will therefore be forced out at once. As a rule no dust at all will get in, since at the packed edge there will be formed a beading of the packing material escaping from the packing joint. In order to secure the above mentioned cooling action, the cooling medium could be guided for instance in a spiral conduit. Such an arrangement is shown in Figs. 3 to 5. The packing plate 16 has a spiral canal 17 which is in connection at its inner end through a passage 18 with an outlet pipe 19 and at its outer end with an inlet pipe 20. This is for a situation in which the dust to be excluded is inside the drum with which the packing plate is used. The cooling effect is diminished from the outside toward the inner surface 21 and the result is that the consistent fat like packing material is warmer and therefore softer near the center, resulting in a gradual flow of the packing material toward the center. If the dust to be excluded is outside the drum the pipe 19 is made the inlet pipe and the pipe 20 the outlet pipe, so that the flow of the packing material is reversed.

What I claim is:—

1. In a device of the class described, a revoluble drum for containing highly heated matter, said drum having an opening therein, a stationary member associated with the opening of said drum, and packing means between said drum and stationary member surrounding said opening, said packing means comprising plates on said drum and stationary member having packing surfaces extending transversely to the axis of the drum, packing material between said packing surfaces, said packing material being solid at ordinary temperatures and having the property of melting upon moderate heating, and means for cooling one of said plates.

2. A device according to claim 1 in which the means for cooling one of said plates comprises a spiral canal in the plate to be cooled and means connected with the opposite ends of said canal for conveying a cooling medium to and from the same.

3. In a device of the class described, a revoluble drum for containing highly heated matter, said drum having an opening therein, a stationary member associated with the opening of said drum, and packing means between said drum and stationary member surrounding said opening, said packing means comprising plates on said drum and stationary member having packing surfaces extending transversely to the axis of the drum, a packing consisting of fat between said packing surfaces, and means for cooling one of said plates.

EMIL EDWIN.